(12) United States Patent
Federspiel et al.

(10) Patent No.: US 6,972,367 B2
(45) Date of Patent: Dec. 6, 2005

(54) MULTI-CHANNEL RACEWAY

(75) Inventors: Mark E. Federspiel, West Bend, WI (US); Edward P. Dyer, Germantown, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 44 days.

(21) Appl. No.: 10/284,076

(22) Filed: Oct. 30, 2002

(65) Prior Publication Data

US 2003/0089515 A1 May 15, 2003

Related U.S. Application Data

(60) Provisional application No. 60/335,441, filed on Oct. 31, 2001.

(51) Int. Cl.[7] .................................................. H02G 3/04
(52) U.S. Cl. ........................ 174/48; 174/68.1; 174/68.3; 52/220.5; 439/207
(58) Field of Search ............................ 174/48, 50, 68.1, 174/68.3, 72 A, 72 C, 97, 96; 52/220.1, 220.5; 419/207

(56) References Cited

U.S. PATENT DOCUMENTS

| | | |
|---|---|---|
| 2,317,964 A | 4/1943 | O'Brien |
| 2,440,668 A | 4/1948 | Tarbox |
| 3,060,069 A | 10/1962 | Sindars |
| D200,049 S | 1/1965 | Hudson |
| 3,403,220 A | 9/1968 | Riedel et al. |
| 3,546,360 A | 12/1970 | Bailey |
| 3,554,236 A | 1/1971 | Rhodes |
| 3,761,603 A | 9/1973 | Hays et al. |
| 3,763,401 A | 10/1973 | Ransom |
| 3,786,171 A | 1/1974 | Shira |
| 3,890,459 A | 6/1975 | Caveney |
| 3,906,146 A | 9/1975 | Taylor |
| 4,166,195 A | 8/1979 | Schwab |
| 4,278,834 A | 7/1981 | Boundy |
| 4,391,426 A | 7/1983 | Gothberg |
| 4,530,865 A | 7/1985 | Sprenger |
| 4,602,124 A | 7/1986 | Santucci |
| 4,619,488 A | 10/1986 | Martin |
| 4,627,469 A | 12/1986 | Buard |
| 4,627,679 A | 12/1986 | Billette de Villemeur et al. |
| 4,629,826 A | 12/1986 | Thomas |
| 4,640,314 A | 2/1987 | Mock |
| D295,168 S | 4/1988 | Pisciotta |
| 4,766,662 A | 8/1988 | Bradshaw et al. |
| 4,864,082 A | 9/1989 | Ono et al. |
| 4,879,955 A | 11/1989 | Moll et al. |
| 4,891,471 A | 1/1990 | Ono et al. |
| 4,907,767 A | 3/1990 | Corsi et al. |
| 4,952,163 A | 8/1990 | Dola et al. |
| 4,967,799 A | 11/1990 | Bradshaw et al. |
| 5,024,251 A * | 6/1991 | Chapman ..................... 138/92 |
| 5,024,614 A | 6/1991 | Dola et al. |
| D318,269 S | 7/1991 | Hassel et al. |
| 5,086,195 A | 2/1992 | Claisse |
| 5,089,667 A | 2/1992 | Goussin et al. |
| 5,161,580 A | 11/1992 | Klug |
| D331,916 S | 12/1992 | DuBrucq |
| 5,184,441 A | 2/1993 | Balfanz, Jr. |
| D333,652 S | 3/1993 | Feldman et al. |
| 5,206,972 A | 5/1993 | Nudelmont et al. |
| 5,235,136 A * | 8/1993 | Santucci et al. ........... 174/68.3 |
| 5,287,666 A | 2/1994 | Frascaroli et al. |
| D348,432 S | 7/1994 | Dubruco |

(Continued)

*Primary Examiner*—Dhiru R. Patel
(74) *Attorney, Agent, or Firm*—Ryan Kromholz & Manion, S.C.

(57) ABSTRACT

A modular raceway system for any combination of high voltage power lines and low voltage data communication lines uses a combination hinge-latch cover member and a single piece base member. The system incorporates an elliptical profile and eliminates conventional sidewalls, and presents the hinge-latch mechanism to releasably secure a cover member in a snap-lock manner to the base member.

11 Claims, 10 Drawing Sheets

U.S. PATENT DOCUMENTS

| | | | |
|---|---|---|---|
| 5,336,849 A | | 8/1994 | Whitney |
| 5,359,143 A | | 10/1994 | Simon |
| 5,399,812 A | | 3/1995 | Woszczyna et al. |
| 5,435,606 A | * | 7/1995 | Navazo .................. 285/149.1 |
| D371,343 S | | 7/1996 | Loftus |
| 5,614,695 A | * | 3/1997 | Benito Navazo ............ 174/48 |
| D378,731 S | | 4/1997 | Kopish |
| D379,453 S | | 5/1997 | Fabrizi |
| 5,682,926 A | | 11/1997 | Perttula |
| 5,756,933 A | | 5/1998 | Pitchford et al. |
| 5,792,992 A | | 8/1998 | Handler |
| 5,802,672 A | | 9/1998 | Rohder |
| D401,224 S | | 11/1998 | Mollenkopf et al. |
| D401,566 S | | 11/1998 | Gesmondi et al. |
| D402,262 S | | 12/1998 | Scherer et al. |
| D402,263 S | | 12/1998 | Scherer et al. |
| D402,264 S | | 12/1998 | Carlson, Jr. et al. |
| 5,861,576 A | | 1/1999 | Langston et al. |
| D413,305 S | | 8/1999 | West |
| D413,306 S | | 8/1999 | Scherer et al. |
| 5,942,724 A | * | 8/1999 | Russo et al. .................. 174/48 |
| 5,942,729 A | * | 8/1999 | Carlson et al. ............ 174/68.1 |
| 5,998,732 A | | 12/1999 | Caveney et al. |
| D419,962 S | | 2/2000 | Caveney |
| 6,037,543 A | | 3/2000 | Nicoli et al. |
| 6,084,180 A | | 7/2000 | DeBartolo, Jr. et al. |
| D429,225 S | | 8/2000 | Halliday |
| 6,107,575 A | | 8/2000 | Miranda |
| 6,107,576 A | * | 8/2000 | Morton et al. .............. 174/101 |
| D430,543 S | | 9/2000 | Rohder |
| 6,119,731 A | | 9/2000 | Nakagawa et al. |
| 6,180,878 B1 | | 1/2001 | Gretz |
| 6,188,024 B1 | | 2/2001 | Benito-Navazo |
| 6,211,460 B1 | | 4/2001 | Hull et al. |
| 6,262,365 B1 | | 7/2001 | Ewer |
| 6,323,421 B1 | | 11/2001 | Pawson et al. |
| 6,335,484 B1 | | 1/2002 | Jarry et al. |
| 6,342,675 B1 | | 1/2002 | DeBartolo, Jr. et al. |
| 6,353,181 B1 | | 3/2002 | Jarry et al. |
| 6,362,420 B1 | | 3/2002 | Bacouelle et al. |
| 6,384,336 B1 | | 5/2002 | VanderVelde et al. |
| 6,437,243 B1 | | 8/2002 | VanderVelde et al. |
| 6,437,244 B1 | | 8/2002 | Vander Velde |
| D462,253 S | | 9/2002 | Caveney et al. |
| 6,459,038 B1 | * | 10/2002 | Waszak et al. ................ 174/48 |
| 6,476,327 B1 | | 11/2002 | Bernard et al. |
| 6,478,499 B1 | | 11/2002 | Fugman et al. |
| D473,850 S | | 4/2003 | Rouleau et al. |
| 6,559,378 B1 | | 5/2003 | Bernard |
| 6,576,834 B2 | * | 6/2003 | Coutant et al. ................ 174/48 |
| 2003/0079899 A1 | | 5/2003 | Bernard |

* cited by examiner

MULTI-CHANNEL RACEWAY

RELATED APPLICATION

This application claims the benefit of provisional application Ser. No. 60/335,441, filed 31 Oct. 2001.

BACKGROUND OF THE INVENTION

The present invention relates to wiring duct assemblies, and in particular to a modular duct assembly or raceway permitting installation of electric, telecommunication, computer network and/or video communication wiring and connections on an existing surface, such as a wall, floor or ceiling. Specifically, the invention provides a raceway duct assembly and various connectors that can be easily installed and internally divided to define separate passageways for each type of wiring extending there through. More particularly, the invention provides a raceway duct assembly providing a closure having features that ease the installation of the various wires and connections, is easy to close, and yet is resistant to tampering or accidental opening.

It is common during the remodeling of existing buildings to encounter the requirement that electrical lines, telephone lines, computer network connections and video conference connections be installed where there previously were none. Furthermore, the option of installing each respective type of wire in existing walls is either cost prohibitive or structurally impossible. Often, older buildings have columns or other irregularities along their walls. The raceway duct assembly must be capable of accommodating for surface changes. In addition the duct must be capable of turning corners, for example where two walls meet one another.

Various raceway duct assemblies are known in the prior art. The simplest system consists of a single conduit for containing one type of wire. Each conduit section is cut and receptacle boxes are located at predetermined positions along the single conduit. Ultimately, all components are secured to a mounting surface, such as a wall. Another common system generally utilizes a main conduit section defining a main passage for a particular type of conductor (i.e. electrical power wires). In order to add additional passages for other types of conductors (i.e. telephone wires or computer networking wires), one or more conduit sections are positioned along and parallel to the sidewall of the main section. Again, various receptacle boxes are installed along the parallel raceways.

Other known, yet more sophisticated raceway duct assemblies provide for the installation of dividers within the main conduit. The dividers may be preformed in the conduit. Others are attached using screws, adhesive or by a convention snap fit arrangement. For example, the provision or installation of two dividers within the main conduit would provide three separate passageways.

Traditionally, most raceway duct assemblies have a rectangular cross-section. In one common embodiment, a substantially flat base piece is mounted to the wall. The wires are placed in a raceway cover whose cross-section is "U" shaped. The raceway cover is then attached to the base. In another common embodiment, the "U" shaped section includes the base. After the wires have been installed within the "U" shaped base section, a flat cover is attached to form a complete closure.

One of the drawbacks of the traditional assemblies is that it is often difficult to install a plurality of wires in separate passageways and retain the wires in their respective passageways until the cover is installed. Another drawback of known systems is the ability to provide a cover that is easy to install, yet resistant to tampering and accidental opening. Therefore, there exists a need for a raceway duct system capable of defining different passageways for different wiring types, capable of being easily affixed to the floor, wall or ceiling of an existing room, and having a closure that is easy to close yet resistant to tampering and accidental opening.

SUMMARY OF THE INVENTION

It is an object of the present invention to provide a raceway duct assembly, including various fittings that fit together with minimal effort and locate securely upon a surface.

It is another object of the present invention to provide a raceway duct assembly having a cover and base, whereby the cover may be hingedly connected to the base during installation of the wiring.

It is a further object of the present invention to provide a raceway duct assembly that is resistant to tampering or accidental opening.

It is yet a further object of the present invention to provide an offset elbow section to accommodate for small or large changes in the surface upon which the assembly is mounted.

It is yet a further object to provide a raceway duct assembly that snaps together securely with low force.

It is yet a further object of the present invention to provide a raceway duct assembly that forms a complete and secure enclosure for the wires and connections contained therein.

Devices made in accordance with this invention have particular application in networking, electrical power distribution, telecommunications routing and protection of wire and cable in cable and wire management applications and installations. The present invention overcomes the shortcomings of conventional raceway duct assemblies by providing a raceway duct that can be easily divided onto multiple passageways, can accommodate and retain different types of wire during installation and has a cover that, while easy to close upon installation of the wires, withstands tampering and accidental openings upon impact. The invention further includes various connectors and truncations that allow for the raceway to turn corners, follow off-sets, connect to a wiring source and/or terminate. In each instance, the separate passageways are maintained during any surface transition.

Further, the invention contemplates an improved product design and fabricating technique that avoids the sharp edges associated with conventional rectangular raceway products. The non-rectangular cross-section aids in the invention's ability to absorb accidental or intentional striking without opening and thereby exposing the contained wiring. The improved raceway duct system preferably embodies an interlocking construction that comprises mating extruded plastic base and cover members. The novel design eliminates conventional flat sidewall members. Instead, the base member or alternatively, the cover member, or preferably, both members have integral features that utilize a curvilinear cross-section, preferably, an ellipse, to form a hollow cavity. When such members are fabricated by extrusion molding techniques, for example, the extruded members or components provide for smooth surfaces.

The base member is preferably provided with a pair of integrally formed, elliptically profiled and laterally spaced curbs defining a trough. The trough is adapted to releasably receive a complementary top cover. The curbs and troughs are preferably configured to receive the cover member by means of a snap-action grip. A substantial improvement in the present invention is the ability to install the cover to one side of the base member, thus allowing the cover to be hingedly secured to the base. Another feature includes the provision of snap-fit tie mounts that allow the installer to secure pre-selected wires or bundles to the base before closing the cover.

DETAILED DESCRIPTION

Figure 1:
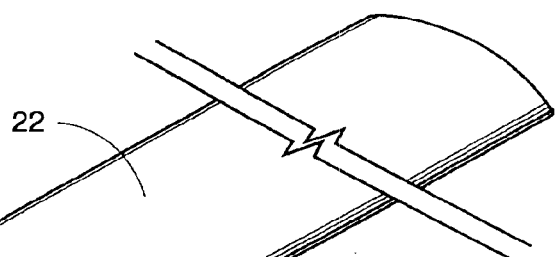
FIG. 1 is a perspective view of the cover member for the modular raceway, and made in accordance with the teachings of this invention.

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Like reference characters are used throughout this description to identify like parts.

The invention contemplates the assembly of various cooperating components fabricated from molded or extruded resilient materials, such as an elastomeric polymer, preferably ABS. The components feature a snap-lock assembly of a combination latch-hinge mechanism. "Snap-lock" means, for example, the ability to assemble two components by hand, without requiring tools, and providing such positive engagement that the two components will not separate absent an applied force. Such an applied force may be, for example, applied by hand or by a tool.

Figure 2:
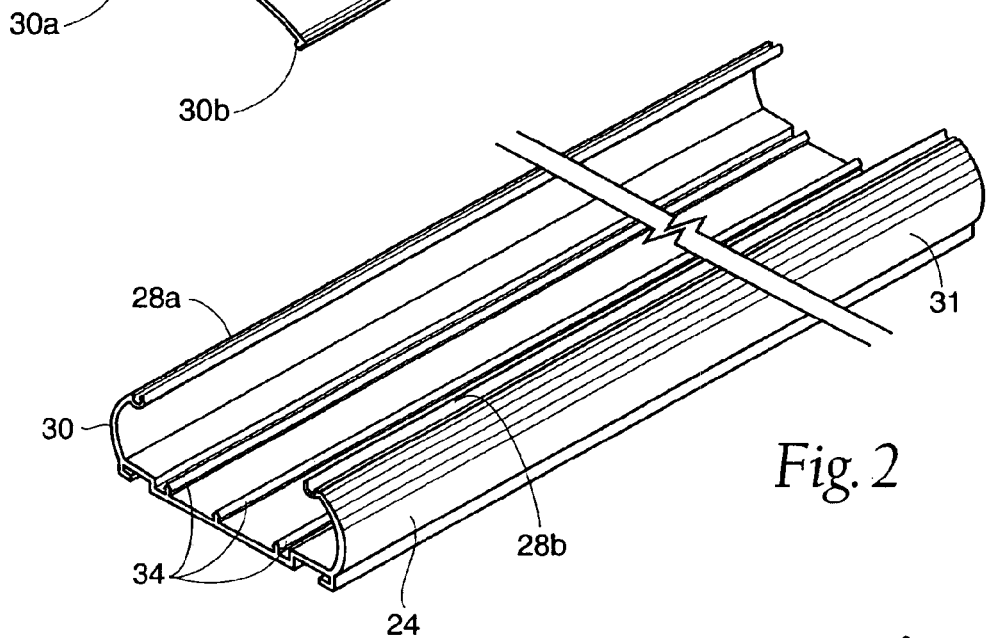
FIG. 2 is a perspective view of the base member of the raceway section of FIG. 1.
Figure 3:
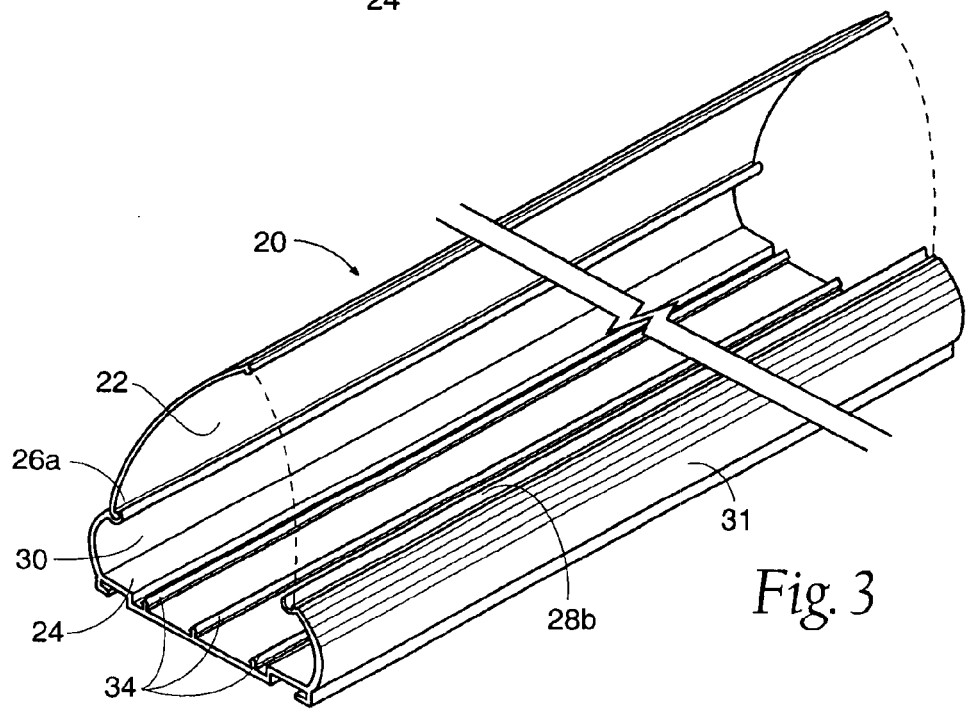
FIG. 3 is a perspective view illustrating the combination hinge-latch mechanism for joining the cover member to the base member.

FIGS. 1–3 show generally the novel invention as embodied in the modular raceway system 20. The cover member 22 mates to a corresponding base member 24 to form a closure. The cover member 22 releasably engages with retaining features on either or both of curbs 30, 31. The curbs 30, 31 are oppositely spaced and run in a longitudinal direction. The bi-directionally opening cover member 22 is hinged to a base member 24 at either of two oppositely disposed hinge-latch mechanisms 26a, 26b. That is, raceway system utilizes a substantially identical hinge-latch mechanism on either side of the base member 24. This permits the cover 22 to be hingedly installed or removed from either side of the base member 24. Alternatively, the cover 22 may be entirely separated from the base member 24.

Figure 4:
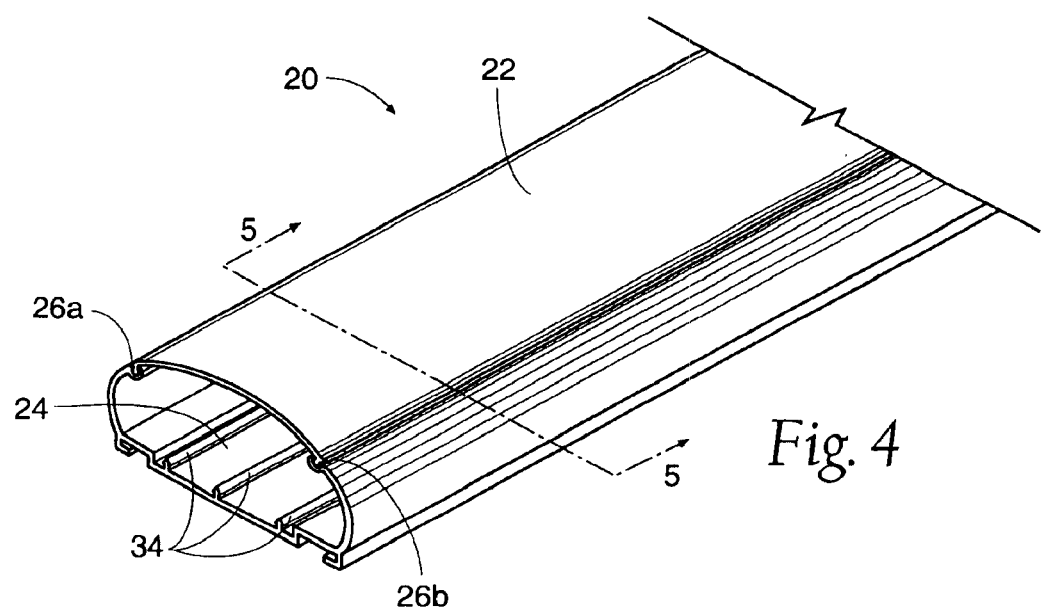
FIG. 4 is a perspective view of a section of raceway illustrating the cover member attached to the base member.
Figure 5:
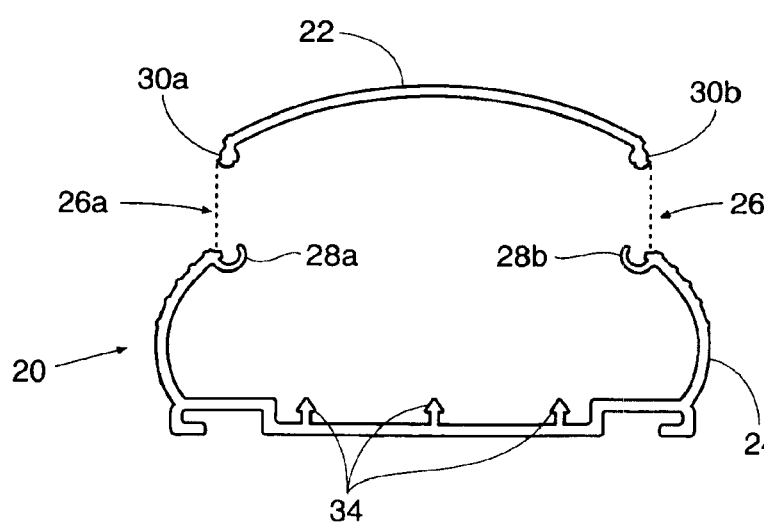
FIG. 5 is an exploded view of a section of raceway taken along line 5—5 of FIG. 4 and depicting the generally oval shape of raceway profile.

The raceway system 20 of the present invention also incorporates a design that eliminates conventional straight, upstanding sidewalls protruding from either or both cover or base members 22, 24. By using a curvilinear profile for a cover member 22 and cooperating base member 24, as best shown in FIGS. 4 and 5, for example, the system provides a stronger, more resilient closure to encapsulate a given interior volume. A preferred embodiment, as again best shown in FIGS. 4 and 5, uses an elliptical profile. However, other curvilinear designs would also prove to be satisfactory and remain within the province of this invention. Examples might include a circular profile, an elliptical profile, a partial ellipse, a true oval, an elongated profile, or other profiles.

The straight sections of the raceway 20 are preferably symmetric about the longitudinal axis. Thus, the cover member 22 may be alternatively hinged or latched from either side of the raceway base member 24. When in a hinged state, the hinge-latch cover member 22, may, for example, be used as a rest or temporary support during installation or routing of wires and cables. Various cables and wires may be initially installed in the cover member 22, but ultimately will be contained entirely within the raceway system 20.

Figure 7:
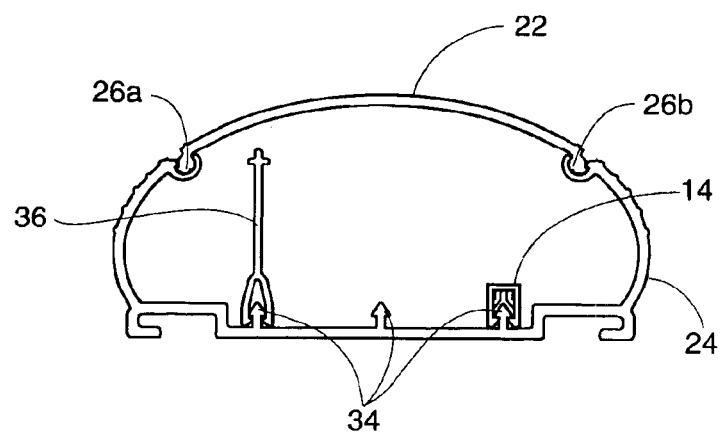
FIG. 7 is an end view of an open portion of raceway containing a single side divider and a cable tie mount.

As shown in the, views of FIGS. 3, 5 and 7, the cover member 22 is secured to the base member 24 by means of a combined hinge-latch mechanism 26a, 26b. The preferred resiliently elastic material of the cover and base members 22, 24 allows for tight tolerances between the pin and socket arrangement that defines the hinge-latch mechanism. This feature allows for a tamper-resistant closure between the cover member 22 and the base member 24 of a raceway system. To facilitate opening of the tight closure, a wedge or screwdriver, for example, is all that is required to release the cover member 22 from the base member 24. However, the inherent elastic nature of the material also allows for easy snap-lock closure.

With reference to FIG. 5, it will be observed that the hinge-latch mechanisms 26a, 26b include a generally C-shaped longitudinal socket or groove 28a, 28b preferably located in base member 24 and running coextensive of the length of the base member. It will be further observed from the view of FIG. 5 that the cover member 22 also has marginal edges with laterally extending, substantially circular cross-sectional pin portions 30a, 30b adapted to be removably received in the C-shaped sockets 28a and 28b, respectively.

Each of the longitudinal socket or grooves 28a and 28b are of generally C-shape in cross-section, and further, the arc of each of the C-shaped grooves extend greater than 180° in order to extend over the diameter of the circular cross-section of the members 30a and 30b, respectively. Each of the longitudinal pin portions 30a and 30b are of a generally circular cross section abutting the edge of the cover member 22. Thus, it will be observed that, the resulting snap-action fit between the base member 24 and cover 22 will provide a releasably engageable connection. It is to be further noted that the configuration of the marginal edges of the cover member end of the curvate upstanding curbs 30 and 31 of the base member 24 permit end-wise closure of the cover member 22 with respect to the base member 24 when so desired. The cover member 22 may be longitudinally displaced with respect to the base member 24 by insertion of the longitudinally extending pin portions 30a and 30b into the socket portions 28a and 28b, respectively, and then slid into the desired final position of the cooperating members 22 and 24. It will be observed from FIG. 3 that the cover member 22 may be inserted with the hinge latch mechanism engaged only on one side to act as a hinge, and as shown with broken lines, may be rotated to a latched position with the opposite edge being inserted into the groove or socket 28b of the base member 24 to its final latched position as shown in FIG. 4.

The base member 24 and cover member 22 cooperate to form a curvilinear profile. The profile may be, for example, generally elliptical. Conventional sidewalls are eliminated from the present invention. However, to adequately secure the cover member 22 to the base member 24, a pair of longitudinally spaced upstanding curbs 30, 31 may be used. As shown in a preferred embodiment, the curbs 30, 31 are integral to the base member 24.

It is further contemplated that the curbs 30, 31 may not be necessary. In such a case, the base member 24 may be generally planar, and the cover member 22 may, for example, consist of an arc of sufficient curvature so that the hinge-latch mechanism 26a, 26b will be located at the intersection of the generally planar base member with such a cover member.

It will also be understood that the hinge-latch mechanism 26a, 26b, as shown, may also be reversed. That is, the marginal edge 30a, which is shown on the cover member 22, and the C-shaped groove 28a located on the base member 24 may be transposed.

Figure 6:
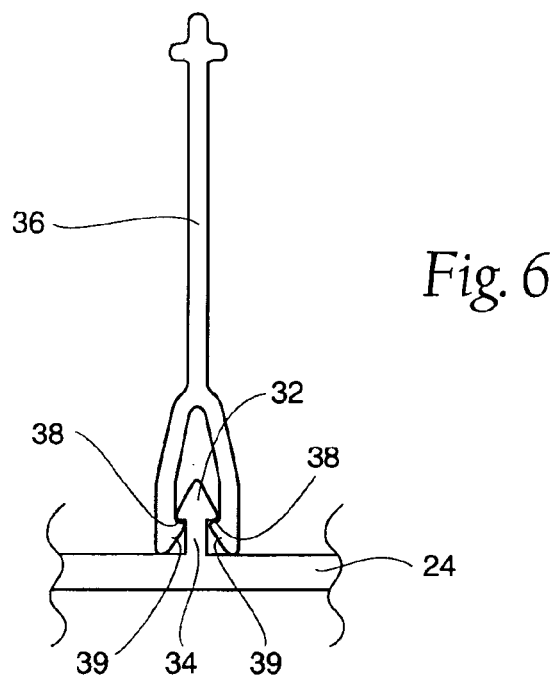
FIG. 6 is a detailed end view of a divider for the raceway.

The present invention further contemplates the use of divided channels defined by at least one upstanding (with respect to the base member 24) divider 36, which may be extruded integrally with the base member 24, or as shown in FIGS. 6 and 7, releasably engageable with a molded or extruded stationary track 34.

The base member 24 lends itself to being formed as an extrusion of a flexible plastic, such as, preferably ABS, and which further permits the formation of one or more coextensive latching rails or tracks 34. With particular reference to FIGS. 6 and 7, it will be observed that the upstanding track or tracks 34 may have an arrow-like cross-section providing laterally extending shoulder portions 38 at either side of the triangular top margin 32 to provide a means for receiving inwardly facing barb-like protrusions 39 formed at the distal end of divider 36, and thereby provide a snap-lock connection between the track 34 and the upstanding divider 36.

Figure 8:
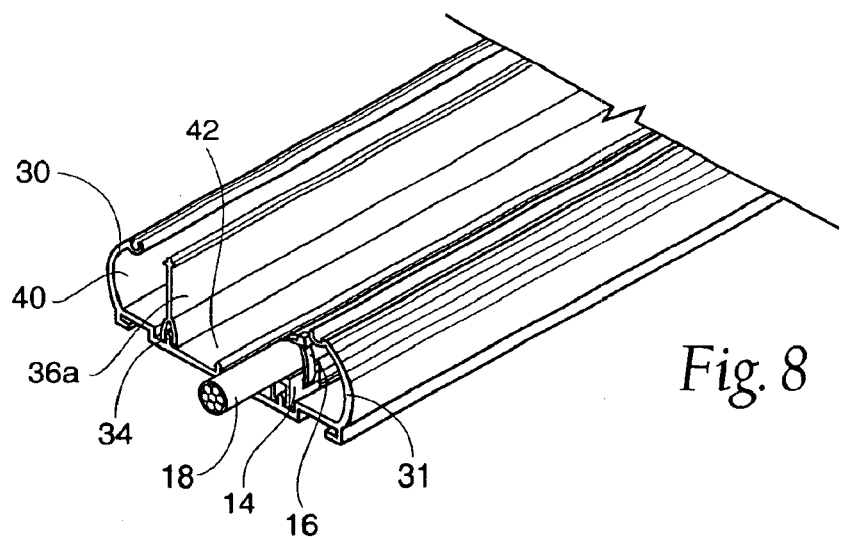
FIG. 8 is a fragmentary perspective view of the base member of the raceway of FIG. 7 with one side divider and one cable tie mount, cable tie and wire bundle inserted therein.
Figure 9:
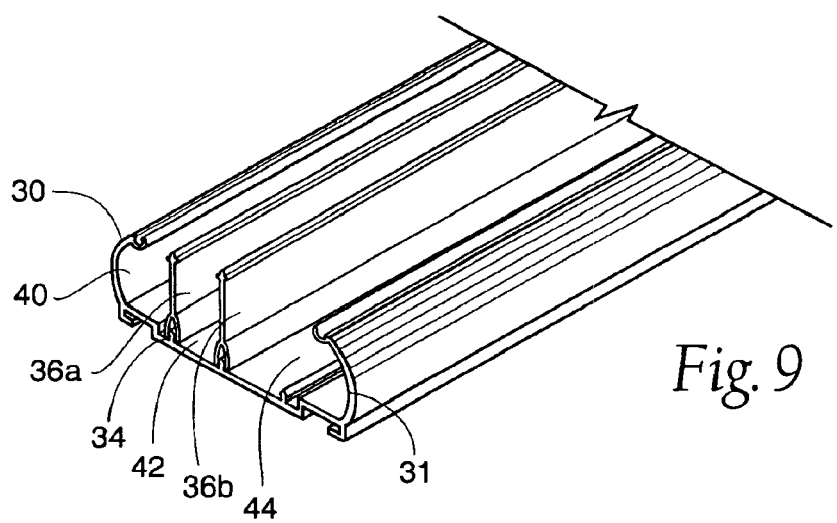
FIG. 9 is a fragmentary perspective view of the base member of the raceway of FIG. 8 with an intermediate divider and one side divider inserted therein.
Figure 10:
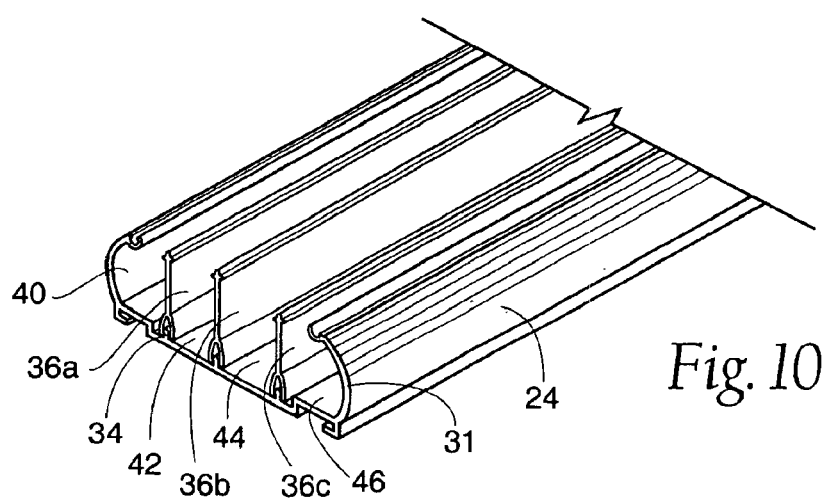
FIG. 10 is a fragmentary perspective view of the base member of the raceway of FIG. 8 with two side dividers and an intermediate divider inserted therein.

With reference to FIGS. 8, 9, and 10, respectively, it will be noted that multiple individual upstanding dividers 36a, 36b, and 36c may create multiple channels 40, 42, 44 and 46 co-extensive with the raceway 20. As shown in FIG. 8, a single divider 36a may be snapped in place along the track or rail 34 to provide a relatively narrow channel 40 and an oppositely disposed wide channel 42.

FIG. 9 is illustrative of use of two dividers 36a and 36b, to form adjacent channels 40, 42 and 44. FIG. 10 illustrates the use of three dividers 36a, 36b, and 36c, which define channels 40, 42, 44, and 46, respectively. Thus, the channels 40-46, inclusive, may be either factory formed integrally of the base member 24 during extrusion thereof, or the components may be made separately and the dividers 36a–36c, inclusive, may be snapped in place in situ, during installation of the raceway 20.

In any case, the dividers 36a–36c, inclusive, are preferably of a height that will permit closure of the cover member 22 with respect to the base member 24 and at the same time provide separation of cables and wires (not shown) supported by the raceway 20.

Figure 6A:
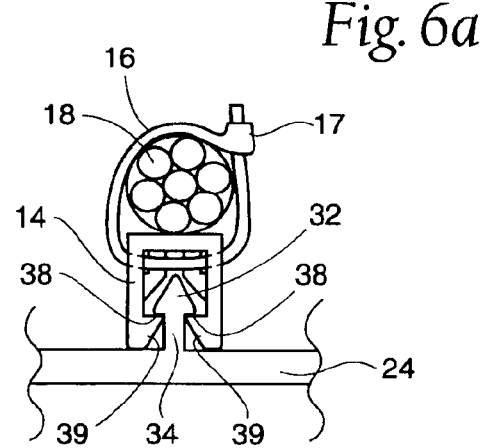
FIG. 6a is a detailed end view of a cable tie mount, cable tie and wire bundle in the raceway.

Referring now to FIG. 6a, it can be seen that the invention further contemplates the optional inclusion of one or more cable tie mounts 14. Each mount includes a pair of inwardly facing barb-like protrusions 39 formed at the distal end of mount 14 to thereby provide a snap-lock connection between the track 34 and the mount 14. Mounts 14 may be snap locked in place along the track 34 to provide a means for temporarily or permanently securing a single wire or wire bundle 18 to the raceway 20. The wire bundle 18 is secured to the mount 14 using a standard cable tie 16 including a locking head 17. FIG. 7 depicts the cable tie mount 14 installed on a rail 34 prior to the placement of the wire 18 and installation of the cable tie 16. It should be understood that the mounts 14 may be first snap fit onto the rails 34 at selected locations and the wires and cable ties secured next. Alternatively, the mounts 14 may be secured to the wire or wire bundle 18 with cable ties 16 prior to installation and then the assembly may be subsequently installed in the raceway 20. FIG. 8 depicts a wire bundle 18 secured with a mount 14 to the raceway 20.

Figure 11:
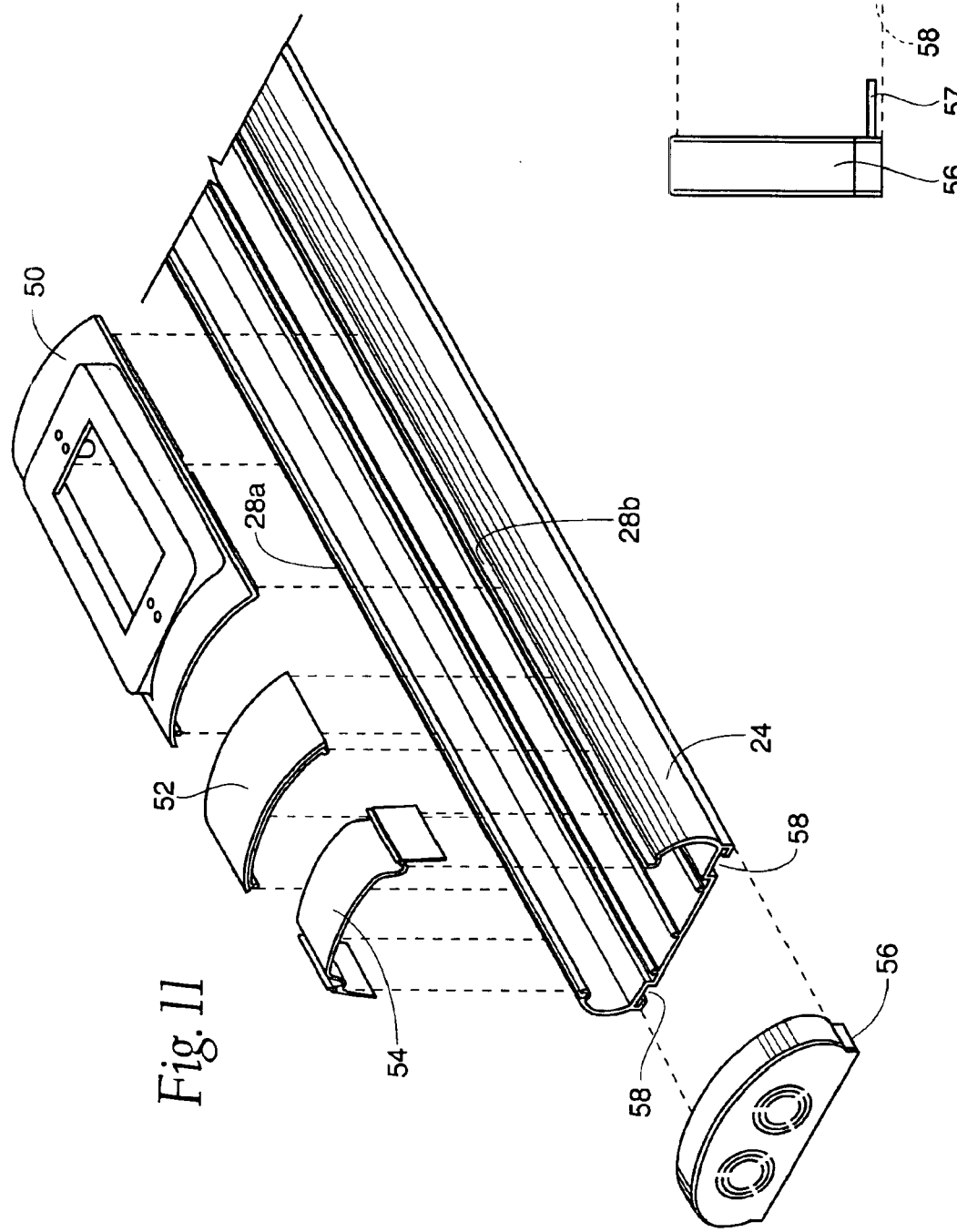
FIG. 11 is an exploded fragmentary perspective and assembly view of a raceway section having a base member, an end cover, a cover member splice, a wire retainer and an outlet box, or other device cover member.

The modular raceway system of the present invention is designed to accommodate many different additional components. One such component is depicted in FIG. 11. To accommodate an outlet, telephone or network receptacle, the cover member 22 (not shown in this Figure) is interrupted. A bracket 50 is provided for retention of a conventional receptacle. The bracket 50 also includes the longitudinal pin configuration at either of its longitudinal marginal edges and may be snapped in place in the groove or sockets 28a and 28b of the base member 24. A filler section or cover spacer 52 may be snapped in place in the same manner as in the case of the bracket 50, to fill any gaps in the cover member 22. Also, a wire retainer 54 may be provided and inserted in the oppositely disposed grooves 28a and 28b of the cover member 22 to secure wires during installation, as needed.

Figure 12:
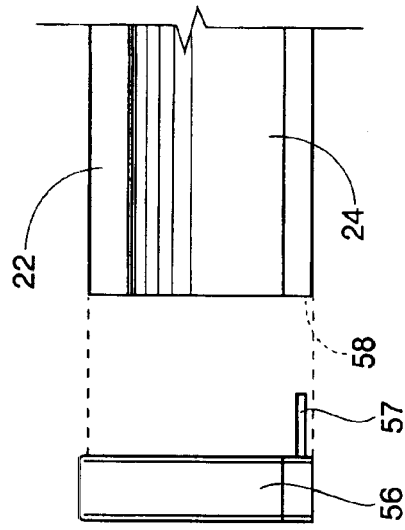
FIG. 12 is a fragmentary side elevational view of a portion of the raceway section of FIG. 11 showing the assembly of an end cover member to the base member.

As shown in FIGS. 11 and 12 is an end cap 56 may be arranged to fit over an exposed end of the raceway base member 24 and cover member 22 at the termination point of the raceway system 20. The end cap 56 preferably overlaps a respective open end margin of the assembled cover 22 attached to the base 24, and includes an integrally molded, laterally extending, tab or tongue portions 57. The tab portions 57 are slidably received in mating retaining channels 58 of the base member 24. The tab portions 57 are of sufficient length and cross section to provide a suitable friction fit with a respective panel 58.

Figure 13:
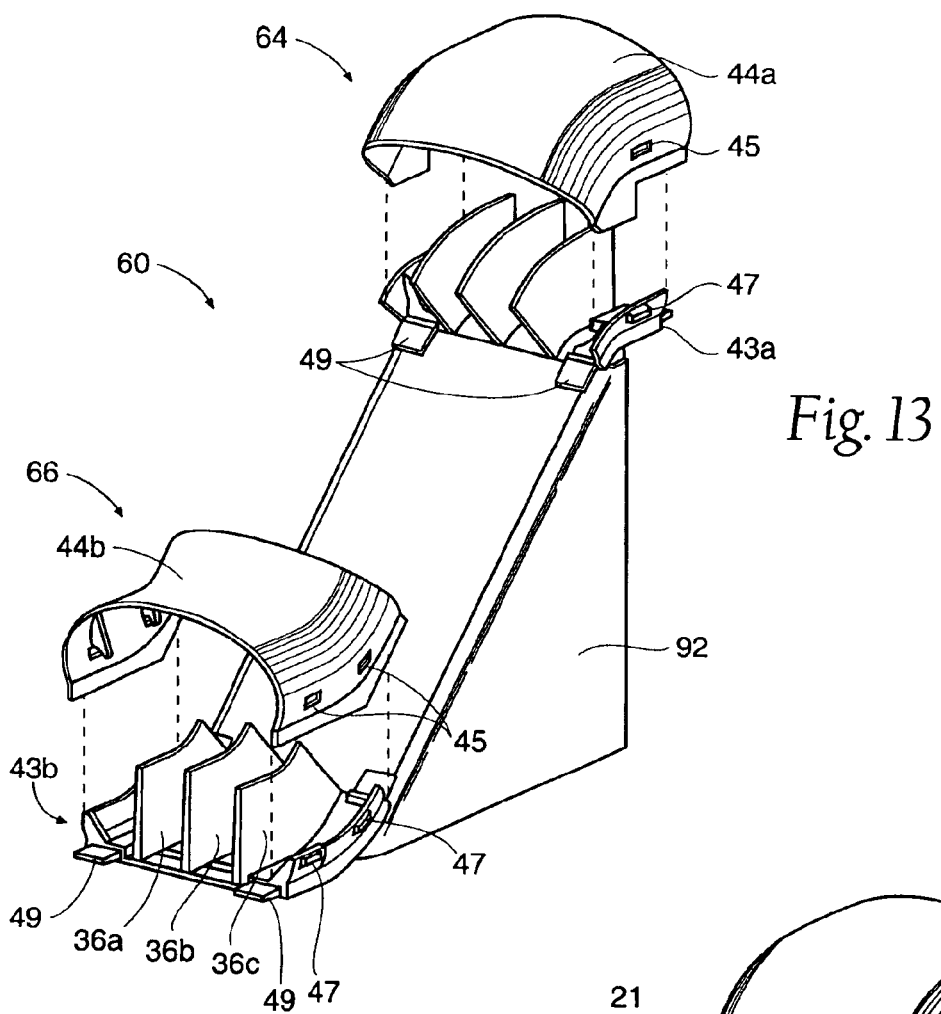
FIG. 13 shows the exploded assembly of a cover member to an offset elbow assembly.
Figure 14:
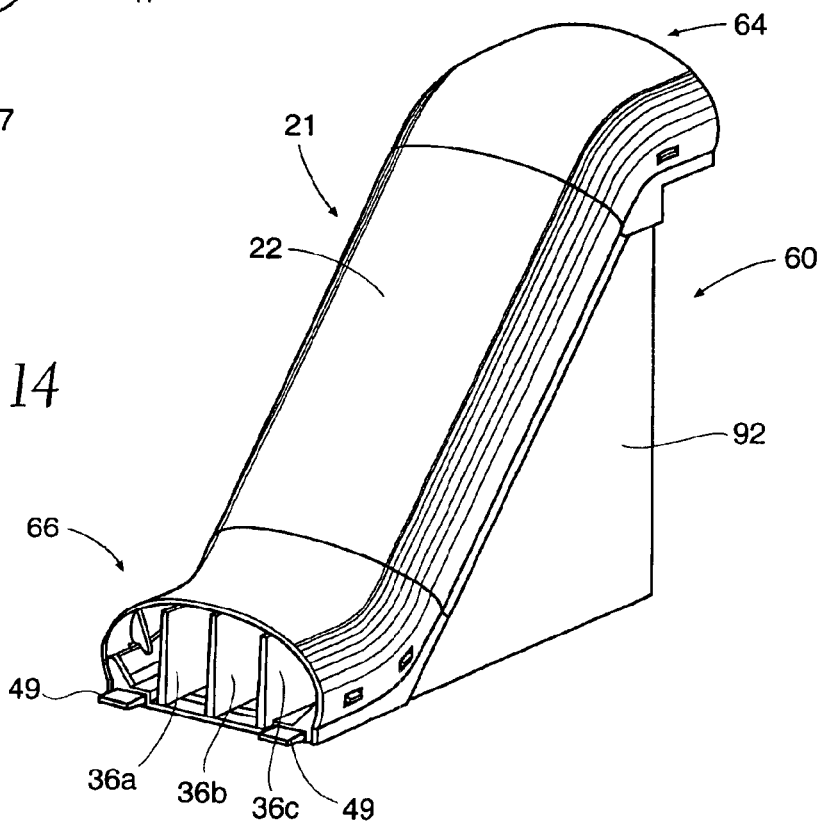
FIG. 14 shows a perspective view of the offset elbow assembly of FIG. 13 with intermediate raceway section inserted between oppositely disposed elbow members.
Figure 15:
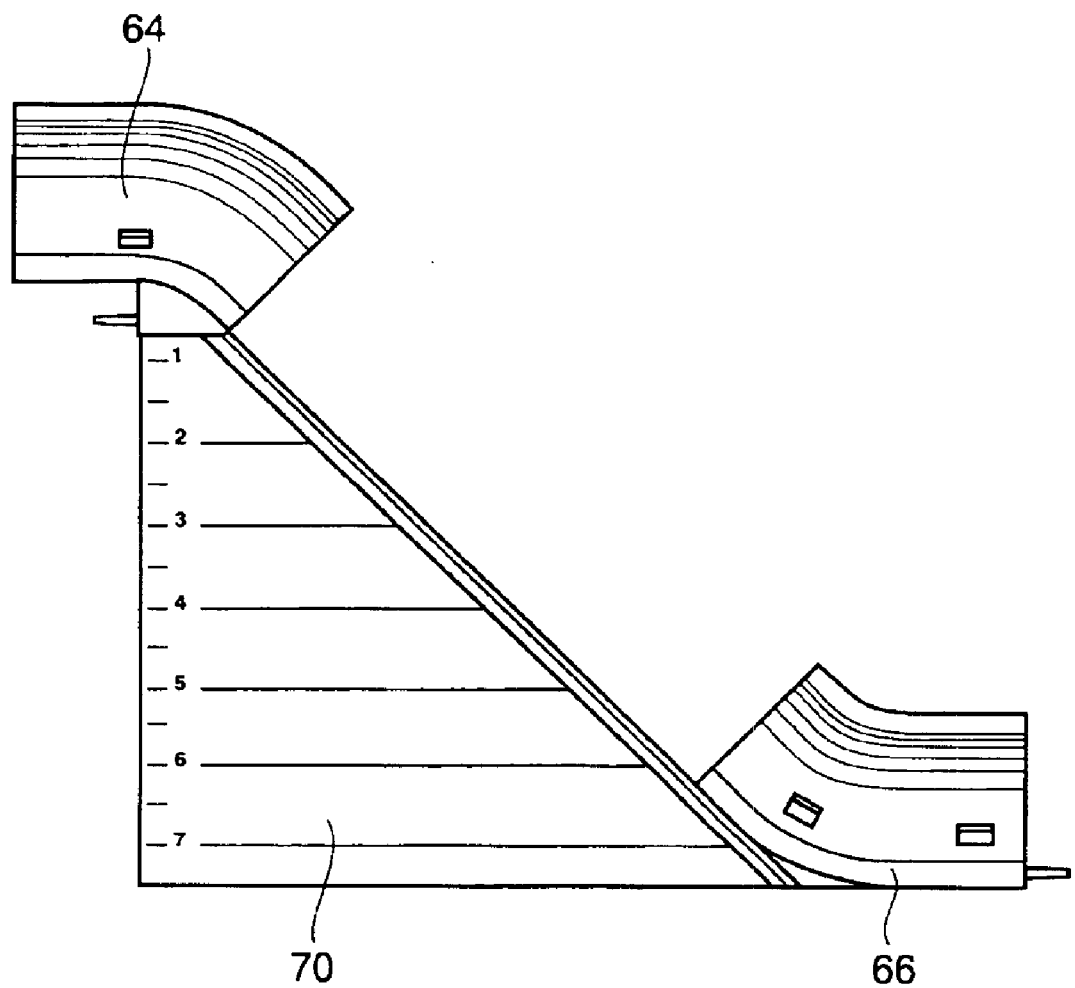
FIG. 15 is a side elevational view of the assembly of FIG. 13 with a cutting template used to determine the required length of an intermediate raceway section to be positioned between the opposed elbow members for a desired offset elbow assembly.

Referring now to FIGS. 13–15, another component of the modular raceway system 20 includes an offset elbow assembly 60. The assembly 60 is designed to allow the raceway system 20 to adapt to offsets in its mounting surface. In the preferred embodiment, the offsets may range from 2 inches to 6 inches. Often walls or ceilings have linear indentations, for example, when going around a support column in a wall or a soffit in a ceiling, or other architectural or structural feature. To accommodate for the interruption in the mounting surface, the present system, as shown in FIGS. 13, 14 and 15, includes an offset elbow filler 92, an interior elbow 64 and an exterior elbow 66. The elbows are either in direct contact with each other, as for example, required in a 2" offset, or may be connected by a straight raceway section 21 that is cut to length depending on the needed offset up to, for example, 6 inches.

Each elbow 64, 66 includes a base portion 43a, 43b and a cover portion 44a, 44b. The cover has a number of slots 45 formed along its sides for receiving mating tabs 47 integrally formed in each base portion 43a, 43b. The base portions 43a, 43b are further provided with integrally formed tabs or tongue portions 57 that are frictionally received within the mating base member 24 of raceway 20. As further depicted in FIGS. 13 and 14, elbows 64 and 66 may further include one or more dividers 36a, 36b and 36c for defining separate channels or passageways.

FIG. 15 illustrates an optional guide, or right triangular template 70 that can be used for example, to determine the appropriate length to cut a straight section of raceway 21 in order to create the desired size of an offset assembly. In practice, the installer would measure the depth of the offset of the mounting surface. That dimension would be transferred to the guide 70. A section of raceway (not shown) would be placed to rest on the hypotenuse of the triangular template 70, and the linear measurement would be transferred to the raceway, resulting in the appropriate cut length.

Figure 16:
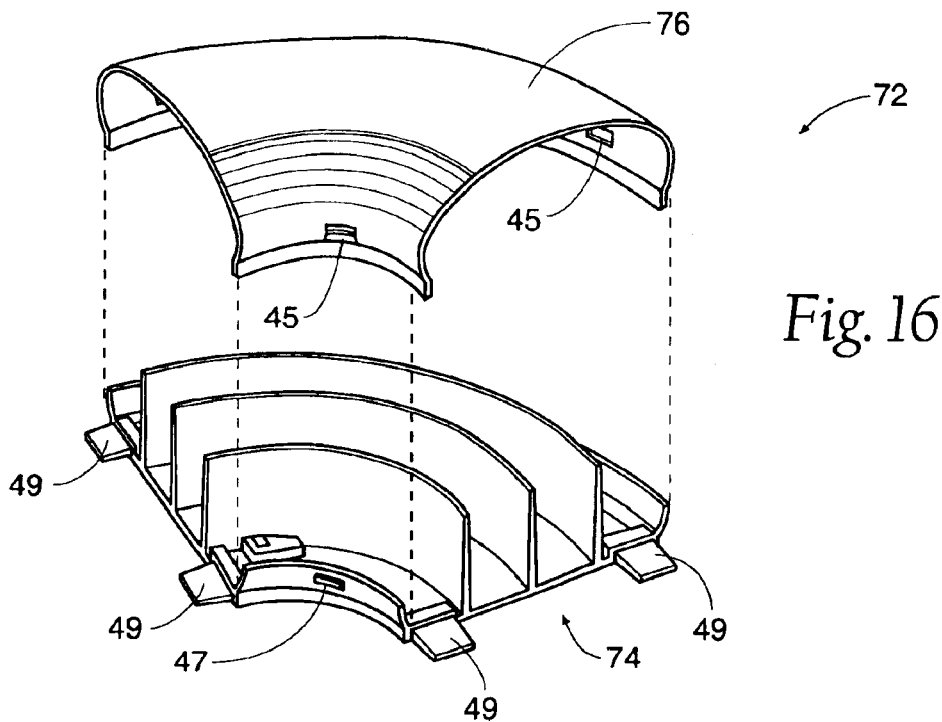
FIG. 16 is a perspective exploded assembly view of a flat elbow section and illustrating a typical cover member and cooperating base member.

To continue and expand upon the versatility of the novel raceway system 20, it will be noted from the illustration of FIG. 16 that the system 20 may include one or more flat elbows identified by the general reference 72. Each elbow 72 comprises two cooperating members including a base member 74 and its cooperating cover member 76. Again, cover 76 is provided with a number of openings 45 designed to receive tabs 47 integrally formed in base member 74. Also, connecting tabs 49 are formed at the ends of the elbow 72. Each tabs 49 is frictionally fit within its respective supporting channel 58 (not specifically shown in FIG. 16; but see FIG. 11) the base member 24 of the raceway 20.

Figure 17:
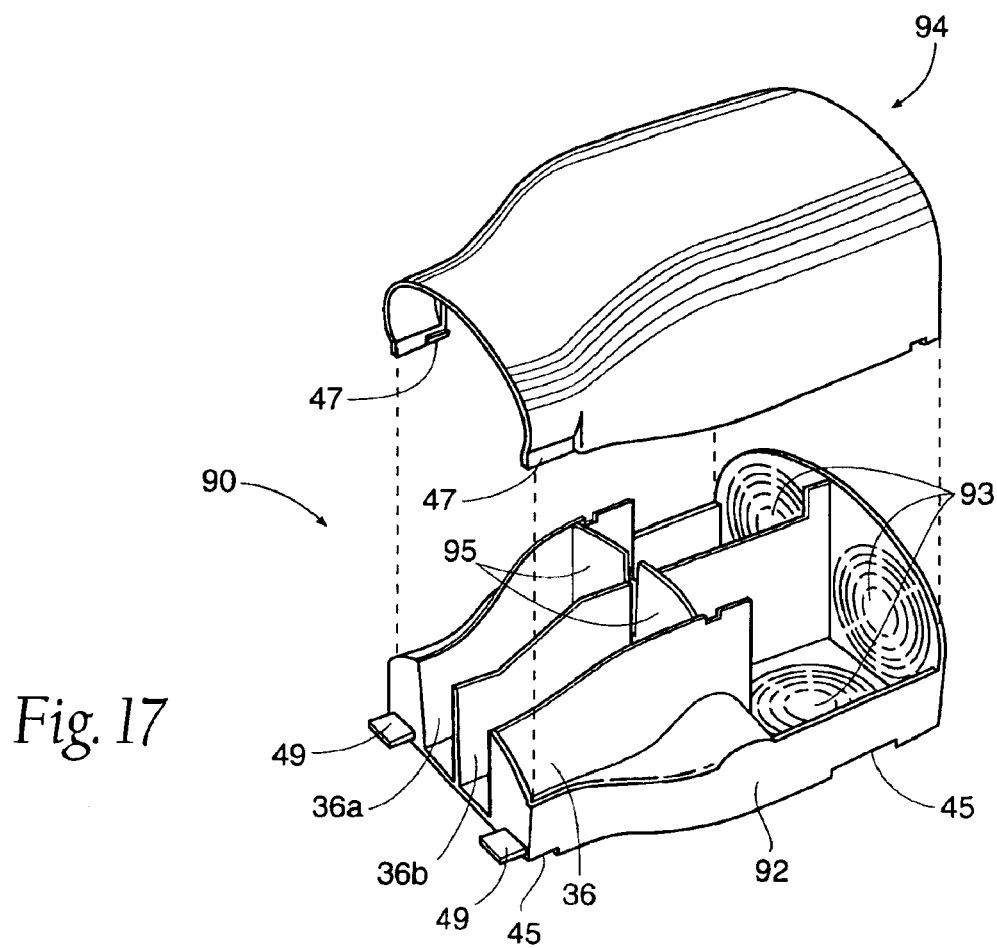
FIG. 17 is a perspective exploded assembly view of an entrance end fitting base member and cooperating cover member.

The illustration of FIG. 17 depicts a modular raceway system 20 component in the form of an entrance end, identified by the general reference numeral 90, and including the cooperating features of the previously-described raceway elbows illustrated in the views of FIGS. 13–16. As in the previous components, like reference characters are used to depict like parts. The base member 92 is arranged to provide an entrance with the aforementioned base member 24. The cover member 94 may be attached to the base member 92 in the same manner as discussed in connection with the elbow embodiments 64, 66 and 72. Optional cooperating dividers 36a, 36b, and 36c may also be provided. One or more "knock-outs" 93 may be formed within an end section or base section of the entrance end 90. The knock-outs 93 may comprise concentric areas of weakness that allow the user to easily remove the desired amount of material to allow for a prior art conduit (not shown) to be connected.

Figure 18:
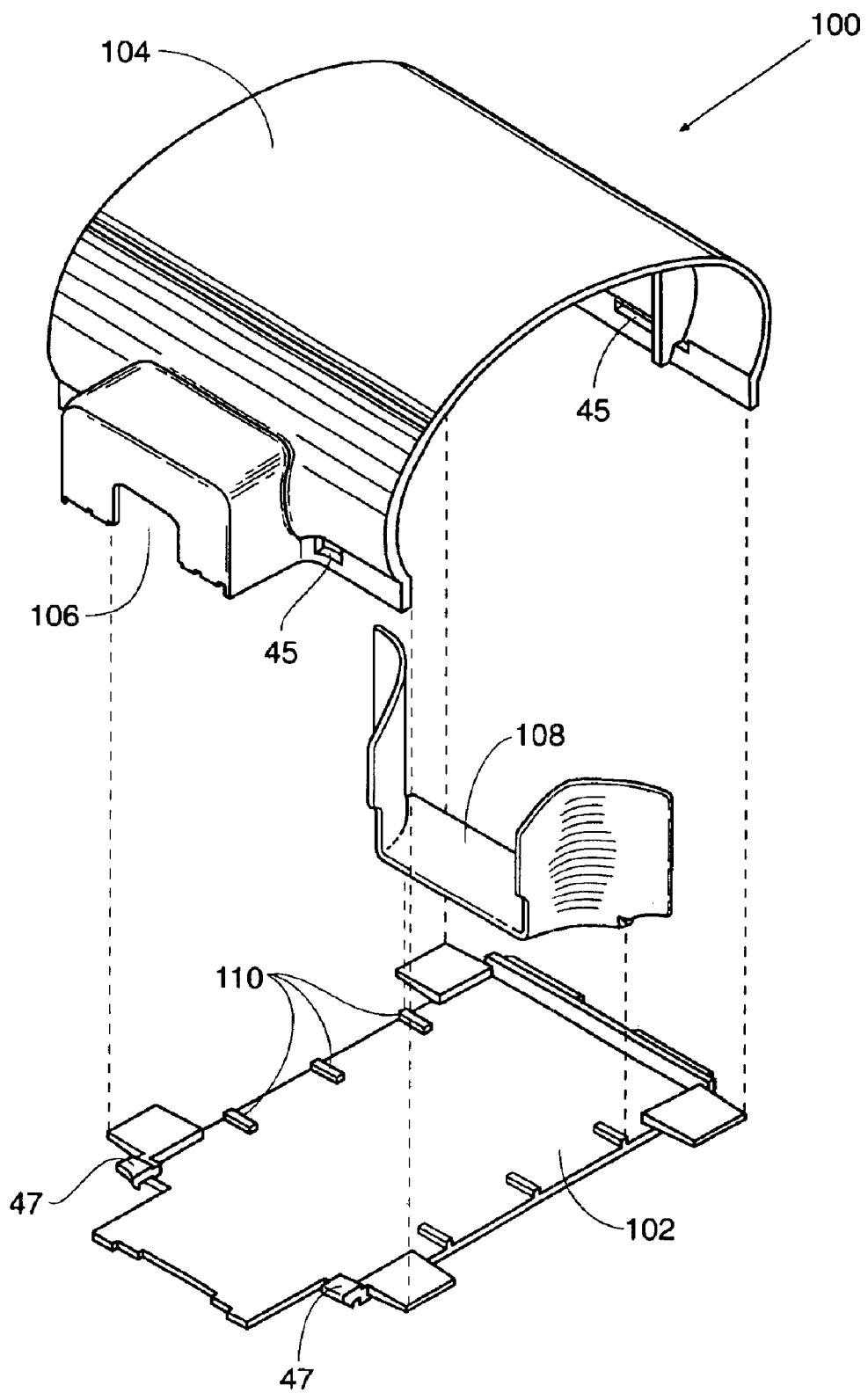
FIG. 18 is a perspective exploded assembly view of an entrance T fitting base member and cooperating cover member.

The illustration of FIG. 18 depicts a modular raceway system 20 component in the form of an entrance T fitting, identified by reference numeral 100, and including the cooperating features of the previously-described elbows 64, 66 and 72 and entrance end section 90 illustrated in the views of FIGS. 13–17. As in the previously described components, like reference characters are used to depict like parts. The base member 102 is arranged to provide an entrance with the aforementioned base member 24, on either side. Base member 102 includes tabs 49 or tongue portions 57, as discussed in relation to previous interconnecting components. The cover member 104 may be attached to the base member 102 in the same manner as discussed in connection with the entrance end section described in connection with FIG. 17 and others, namely through the application of openings 45 situated to receive corresponding tabs 47. Cover 104 includes at least one opening 106 for connection to a prior art conduit or similar structure (not shown). A removable cooperating divider 108 is also provided. The divider 108 may be positioned within the entrance T fitting 100 in one of a plurality of positions as defined by upstanding tabs 110. Divider 108 provides two functions. First, it defines separate channels or passageways for the various wires that may be routed through entrance T fitting 100. Second, it ensures a particular wires, such as fiber optic cables are not bent at a radius or kinked so as to destroy their ability to properly function.

Figure 19:
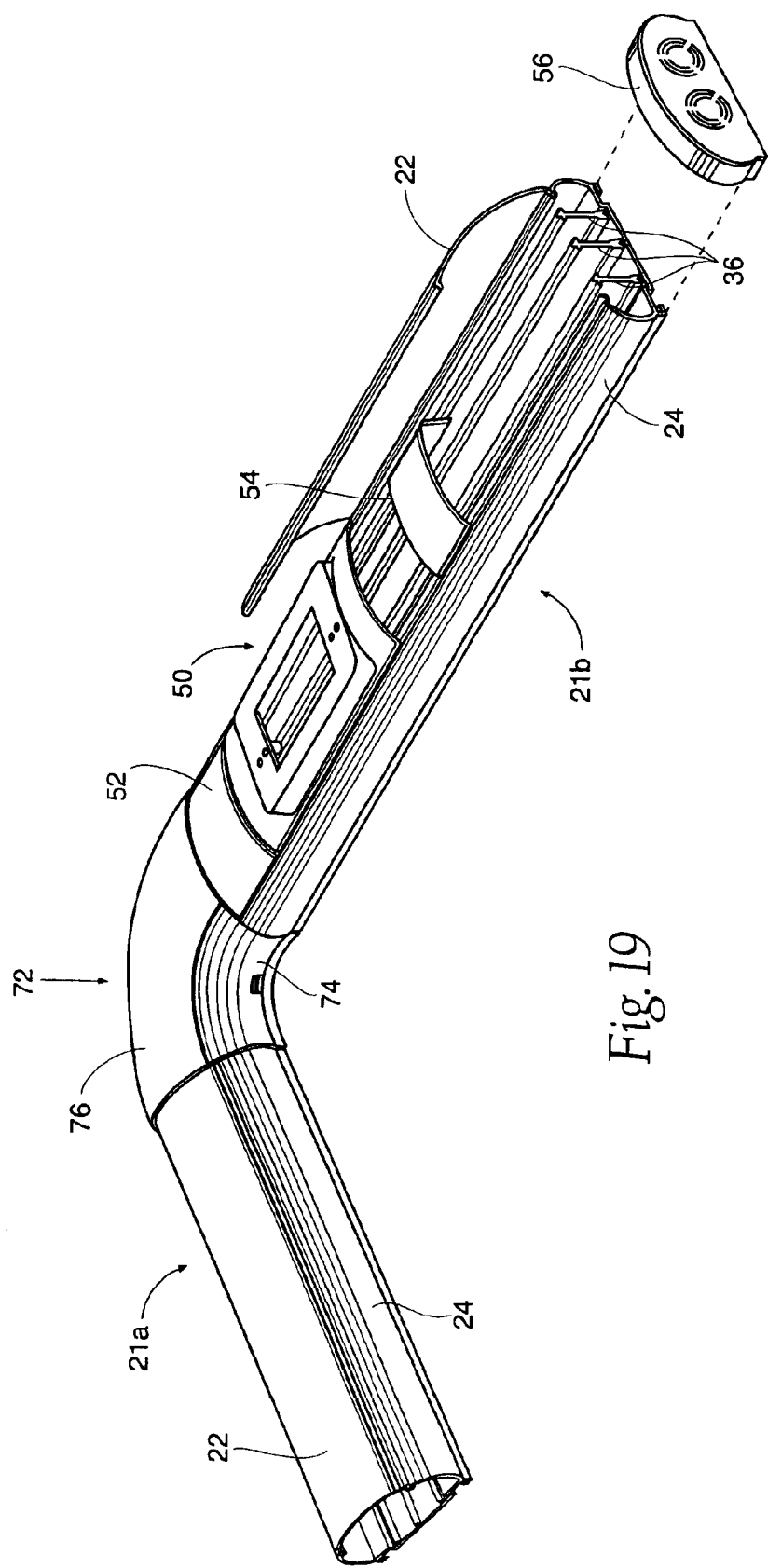
FIG. 19 is a perspective view of a combination of a selected group of possible components of the multi-channel raceway system of the present invention.

FIG. 19 depicts an embodiment of the multi-channel raceway system. In this figure, one embodiment of a partial system 20 is shown. For example, two straight raceway sections 21a and 21b, each having a base member 24 and a cover member 22 are connected by an elbow 72. One straight section 21a is shown with the cover member 22 installed in a closed position and the other straight section 21b in an opened position. The second raceway section 21b is shown with some assembled components. For example, an end cap 56 may be placed at the terminus of the system 20. Also, one or more dividers 36 may be incorporated in the system. An optional wire retainer 54 may be selected to temporarily secure cables and wires (not shown). In addition, a receptacle cover 50 may be added to the system. The receptacle cover 50 may be configured to accommodate many applications. For example, a power outlet or a data terminal, or combinations thereof (not shown). Any gaps that may result between components or sections, for example between the receptacle cover 50 and the elbow 72, may be spanned by a filler piece or splice 52. The elbow 76 is shown with a cover member 72 and a base member 74. It should be understood that the combinations of aforementioned components would result in limitless variations, thus enabling the installer or other user to provide a unique layout using standard components.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A modular raceway system comprising a base member, a removable cover member, and a detachable hinge-latch mechanism, said cover member being adapted to cooperate with said base member to create an interior cavity, said hinge-latch mechanism being symmetrical at a hinging portion and a latching portion, and wherein the means for alternatively attaching and detaching the divider member to and from the base member comprises a longitudinally extending protrusion integrally formed with said base member;

said protrusion having a flared head defining at least one laterally extending shoulder portion;

said divider member having a longitudinally extending groove arranged to overly and engage with said protrusion;

said groove defining a inwardly extending barbed portion;

said barbed portion being adapted to receive the flared head of the protrusion and thereby permit releasable attaching engagement of the barbed portion with said shoulder portion.

2. A modular raceway system comprising a base member, a removable cover member, and a detachable hinge-latch mechanism, said cover member being adapted to cooperate with said base member to create an interior cavity, said hinge-latch mechanism being symmetrical at a hinging portion and a latching portion, and wherein the base member further comprises wire retention means, said wire retention means comprising a wire retainer insert having an intermediate crowned portion and oppositely spaced arms;

each of said arms including a shoulder located proximate to the distal ends thereof and engageable with said base member and in underlying engagement with said hinge-latch mechanism.

3. A modular raceway system comprising a base member, a removable cover member, and a detachable hinge-latch mechanism, said cover member being adapted to cooperate with said base member to create an interior cavity, said hinge-latch mechanism being symmetrical at a hinging portion and a latching portion, and further including a cavity enclosing end cap member and means for releasably attaching said end cap member to at least one end of said base member and cooperating cover member when said members are closed to provide said interior cavity, said system including a grooved retaining surface, a coextensively longitudinal groove relative to the underside of said base member, and a tab portion laterally extending from said base member, said tab portion arranged to be slidably received by said groove and being configured to provide a friction fit within said groove.

4. A modular raceway system for an offset mounting surface wherein said surface comprises a first support portion being laterally spaced from a substantially parallel second support surface wherein each of said surfaces conjointly intersects an intermediate portion;

said system comprising at least one base member releasably attached to a corresponding cover member, and an offset elbow assembly coupled to the base member;

said offset elbow assembly comprising an interior elbow portion mounted to the first support surface and an exterior elbow portion mounted to the second support surface;

said exterior elbow portion connected to said interior elbow portion by a connecting means.

5. The modular raceway system of claim 4 wherein the connecting means includes an exterior elbow releasably attached directly to the interior elbow.

6. The modular raceway system of claim 4 wherein the connecting means comprises the exterior elbow releasably coupled to an intermediate member at a first end, and said means further comprises the interior elbow releasably coupled to the intermediate member at a second end.

7. The modular raceway system of claim 6 wherein said connecting means further includes a temporary guiding template for selectively determining a desired length of the intermediate portion.

8. The modular raceway system of claim 7 wherein said template comprises a right triangular member having a measuring scale.

9. A modular raceway system comprising:

a base member, a removable cover member, and a detachable hinge-latch mechanism;

said cover member being adapted to cooperate with said base member to create an interior cavity;

said base member including at least one divider member for dividing said interior cavity into at least one pair of parallel channels and releasably removable means for attaching said divider member to the base member;

said means for attaching the divider member to the base member further comprising a longitudinally extending protrusion integrally formed with said base member;

said protrusion having a flared head defining at least one laterally extending shoulder portion;

said divider member having a longitudinally extending groove arranged to overly and engage with said protrusion;

said groove defining an inwardly extending barbed portion;

said barbed portion being adapted to receive the flared head of the protrusion and thereby permit releasable attaching engagement of the barbed portion with said shoulder portion.

10. A modular raceway system comprising:

a base member, a removable cover member, and a detachable hinge-latch mechanism, said cover member being adapted to cooperate with said base member to create an interior cavity;

said base member further comprising wire retention means, said wire retention means comprising a wire retainer insert having an intermediate crowned portion and oppositely spaced arms;

each of said arms including a shoulder located proximate to the distal ends thereof and engagable with said base member and in underlying engagement with said hinge-latch mechanism.

11. A modular raceway system comprising:

a base member, a removable cover member, and a detachable hinge-latch mechanism, said cover member being adapted to cooperate with said base member to create an interior cavity;

a cavity enclosing end cap member and means for releasably attaching said end cap member to at least one end of said base member and cooperating cover member when said members are closed to provide said interior cavity, said system including a grooved retaining surface, a coextensively longitudinally relative to the underside of said base member, and a tab portion laterally extending from said base member, said tab portion arranged to be slidably received by said groove and being configured to provide a friction fit within said groove.

* * * * *